United States Patent [19]

Nagase et al.

[11] 4,302,058
[45] Nov. 24, 1981

[54] VARIABLE LOAD VALVE DEVICE

[75] Inventors: Minoru Nagase; Shigeaki Doto, both of Kobe, Japan

[73] Assignee: Nippon Air Brake Co., Ltd., Kobe, Japan

[21] Appl. No.: 124,209

[22] Filed: Feb. 25, 1980

[51] Int. Cl.³ .............................................. B60T 8/18
[52] U.S. Cl. ..................................... 303/22 A; 303/40
[58] Field of Search ............... 303/22 A, 23 R, 23 A, 303/22 R, 40, 28, 29, 30, 6 R; 188/195

[56] References Cited
U.S. PATENT DOCUMENTS

| | | | |
|---|---|---|---|
| 2,950,147 | 8/1960 | Neubeck | 303/22 A |
| 3,730,597 | 5/1973 | Pickert | 303/22 A |
| 4,077,676 | 3/1978 | Hata | 303/22 A |

FOREIGN PATENT DOCUMENTS 55-56757 4/1980 Japan.

Primary Examiner—Douglas C. Butler
Attorney, Agent, or Firm—G. J. Falce

[57] ABSTRACT

A vehicle load responsive control valve device in which the output pressure regulating valve assembly is controlled by multiple diaphragm pistons, which are arranged separately in tandem relationship and are operative responsive to the fluid pressure of different air springs of the vehicle. Being of equal pressure areas, these diaphragm pistons are effective to exert a control force on the valve assembly according to the higher of the respective air spring pressures to ensure against low brake forces when the pressure of one of the air springs is inadvertently lost under loaded car conditions. Under empty car conditions, a bias spring is effective to obtain a predetermined output pressure.

7 Claims, 5 Drawing Figures

VARIABLE LOAD VALVE DEVICE

BACKGROUND OF THE INVENTION

The present invention relates to a load responsive control valve for generating an output pressure corresponding to a vehicle load.

For example, in existing vehicles having air springs, a load responsive valve device, may be employed to control the braking force corresponding to changes in vehicle weight due to loading and unloading of passengers, etc. As shown in FIG. 1, a known valve device of this type consists of a chamber 1 to which air spring pressure $AS_1$ corresponding to the vehicle load is connected, a chamber 3 to which fluid pressure is connected from an air source via an inlet 2, and a chamber 5 from which the controlled output pressure is discharged through an output 4. A diaphragm piston 6 is arranged in chamber 1 for responding to the air spring pressure $AS_1$, and a spring 7 is placed against diaphragm piston 6. This spring 7 is set at a suitable braking pressure for an empty vehicle. In chamber 5, there is provided an inlet-outlet valve 8 to which is connected a diaphragm piston 9 subject opposingly to the spring 7 and the output pressure in chamber 5. A valve element 10 of inlet-outlet valve 8 controls fluid pressure communication at a passage opening 5a connecting chamber 3 and chamber 5 in response to up and down movement of inlet-outlet valve 8.

When the air spring pressure $AS_1$ is lower than a value corresponding to the preset tension of spring 7 representing the desired braking pressure for an empty vehicle, the inlet-outlet valve 8 is moved upward by the force of spring 7 and valve element 10 is opened allowing the flow of pressurized air from the chamber 3 to the chamber 5. When the downward force exerted on the diaphragm piston 9 by the pressure in the chamber 5 is equalized with the upward force of spring 7, the inlet-outlet valve 8 is moved downward, and the passage opening 5a is closed by the air inlet valve 10. Thus, the output pressure discharged from outlet 4 is controlled to maintain a pressure corresponding to the preset value of spring 7, that is, the braking pressure of the empty vehicle.

When the air spring pressure $AS_1$ is higher than the empty vehicle pressure, diaphragm piston 6 is moved upward against the tension of spring 7, which in turn moves the inlet-outlet valve 8 and valve 10 upward, thereby opening valve 10 to establish fluid pressure communication between chambers 3 and 5 via opening 5a. When the upward force of spring 7 corresponding to the braking pressure of the empty vehicle and the force obtained by subtracting the force of the spring 7 from the force exerted on the diaphragm piston 6 by the air spring pressure $AS_1$ is balanced by the downward force of pressure in chamber 5 acting on diaphragm piston 9, valve 10 is closed to terminate further buildup of output pressure. The relationship is as shown in FIG. 5.

In the case of a load response control valve device of the above-mentioned type, a loss of air spring pressure $AS_1$ due to damage to the air spring or diaphragm piston 6 results in an empty car braking force equivalent to that of spring 7, even in the case of a loaded vehicle. This results in an undesirable increase in the distance required for stopping the vehicle and may result in accidents, such as collisions with the vehicle stopped in front of the said vehicle, thus posing obstacles to safe driving.

SUMMARY OF THE INVENTION

The object of the present invention therefore is to provide an air spring pressure responsive type load control valve device that is free of the aforementioned undesired characteristic leading to unsafe vehicle operation.

This objective is accomplished, by providing a multiple piston abutment in which the respective pistons are arranged in tandem and are operative independently of each other responsive to the presence of fluid pressure from different air springs of the vehicle. In that the respective pistons are of equal pressure area, such a multiple piston arrangement assures that the resulting brake force corresponds to the highest air spring pressure.

BRIEF DESCRIPTION OF THE DRAWING

This objective and other features of the invention will become clear from the following more detailed explanation when taken with the accompanying drawing, in which.

DESCRIPTION AND OPERATION

Figure 1:
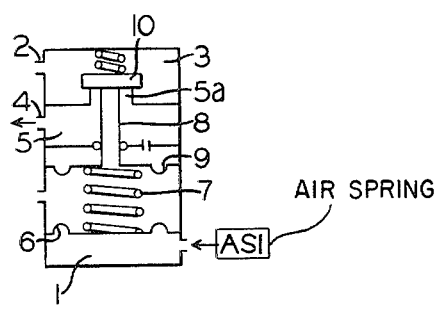
FIG. 1 is a diagrammatic view showing a vehicle load responsive control valve device of known construction.
Figure 2:
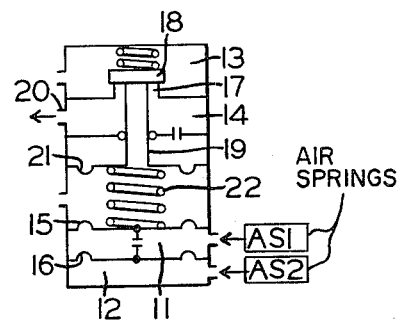
FIG. 2 is a diagrammatic view showing a similar valve construction modified in accordance with the present invention.

Referring now to FIG. 2 of the drawings, the load responsive control valve device of the present invention comprises a chamber 11 into which air spring pressure $AS_1$ of the air spring located on one side of a vehicle is charged, a chamber 12 into which the air spring pressure $AS_2$ of the air spring located on the other side of the vehicle is charged, a chamber 13 to which fluid pressure is supplied from an air source and a chamber 14 from which a controlled output pressure is discharged. In chamber 11, a diaphragm piston 15 responsive to air spring pressure $AS_1$ is placed, and in chamber 12, a diaphragm piston 16 having the same area as diaphragm piston 15 is placed. Diaphragm piston 16 is operative responsive to the air spring pressure $AS_2$, as well as the above-mentioned air spring pressure $AS_1$ acting opposingly to air spring pressure $AS_2$, that is, chambers 11 and 12 are partitioned by diaphragm piston 16, and diaphragm pistons 15 and 16 are placed separately in tandem relationship. In chamber 13, an air inlet valve 18 is placed for opening and closing a passage 17 connecting chambers 13 and 14. In chamber 14, there is placed an inlet-outlet valve 19 for opening and closing inlet valve 18, an outlet 20 for discharging the output pressure regulated by the inlet-outlet valve 19, and a diaphragm piston 21 that is operatively responsive to the output pressure. A spring 22 is placed between diaphragm pistons 21 and 15, and is preset at a value corresponding to a suitable braking pressure for an empty vehicle.

When the air spring pressure $AS_1$ is higher than the air spring pressure $AS_2$, diaphragm piston 16 is pushed downward out of engagement with piston 15, by the pressure difference between chambers 11 and 12, that is, the pressure difference between the air spring pressure $AS_1$ and the air spring pressure $AS_2$. Concurrently, upward force is applied to piston 15 corresponding to the difference between the upward force obtained by multiplying the air spring pressure $AS_1$ by the area of piston 15, and the downward force exerted by spring 22. This resultant upward force is exerted on the diaphragm piston 21 and inlet-outlet valve 19 to thereby open air inlet valve 18. By this operation, the pressurized air flowing into the chamber 13 is connected to chamber 14 through passage opening 17, and is discharged from the outlet 20. When the force exerted on the diaphragm piston 21 by the pressure of chamber 14 is equalized with the upward force exerted on diaphragm piston 21, the air inlet valve 18, diaphragm piston 21 and inlet-outlet valve 19 are moved downward, closing the opening between chambers 13 and 14 to terminate the output pressure of a value corresponding to the higher air spring pressure $AS_1$.

In the reverse circumstances in which air spring pressure $AS_2$ is higher than the air spring pressure $AS_1$, the force of air spring pressure $AS_1$ acting downward on piston 16 diminishes the upward force of air spring pressure $AS_2$ on piston 16 by the same amount that air spring pressure $AS_1$ acting upward on piston 15 reinforces the upward force exerted by piston 16, due to the equal pressure areas of the respective pistons. Consequently, the net upward force exerted by air spring pressure $AS_1$ and $AS_2$ acting on the respective pistons corresponds to that force which would be exerted by the higher air spring pressure $AS_2$ in the absence of air spring pressure $AS_1$, and establishes control of inlet-outlet valve 19, as discussed in the foregoing example. Accordingly, output pressure is realized at a value corresponding to whichever air spring pressure is the higher, i.e., air spring pressure $AS_1$ in the former example and air spring pressure $AS_2$ in the latter example.

In the event both air spring pressures $AS_1$ and $AS_2$ are below a value corresponding to an empty vehicle pressure, the net effective upward force exerted by the air spring pressures on pistons 15 and 16 is insufficient to overcome the preset force of spring 22, when the upward acting spring load is balanced by output pressure acting downward on piston 21, thus limiting output pressure to an empty vehicle load condition.

Figure 3:
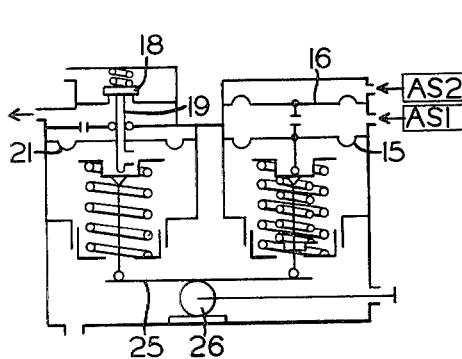
FIG. 3 is a diagrammatic view showing a load responsive control valve device incorporating the feature of the present invention in an arrangement wherein the degree of vehicle air spring pressure influence upon the control valving is manually adjustable.
Figure 4:
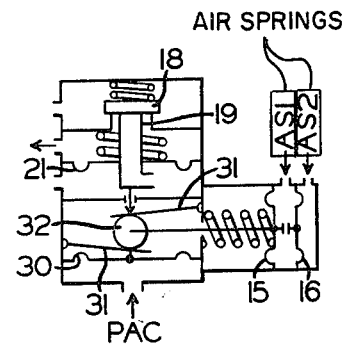
FIG. 4 is a diagrammatic view showing a load responsive control valve device incorporating the feature of the present invention in an arrangement wherein the vehicle air spring pressure automatically varies the mechanical advantage with which a control force is transmitted to the control valving.

The application examples of this design to other load response systems are illustrated in FIGS. 3 and 4.

Figure 5:
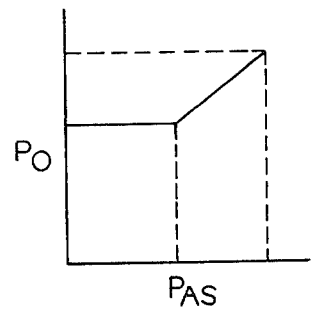
FIG. 5 is a graph showing the output pressure versus air spring pressure relationships developed in accordance with the valve devices of FIGS. 2, 3, and 4.

In FIG. 3, diaphragm pistons 15 and 16 are placed in parallel with diaphragm piston 21 unlike the series arranged placement of diaphragm pistons 15, 16, and 21 in FIG. 2. A lever 25 connects pistons 15, 16 and piston 21 by way of a roller 26 on which the lever 25 is fulcrumed. The position of roller 25 is made manually adjustable to vary the lever ratio and thus the gradient of the curve in FIG. 5.

In FIG. 4, a relay type load responsive control valve device, in accordance with the present invention, is provided. An increased brake command pressure PAC is shown, in which the fluid pressure force exerted on diaphragm piston 30 by the brake control pressure PAC forces the diaphragm piston 21 and inlet-outlet valve 19 upward by the action of levers 31 and 31', which are pivotally connected to the valve casing, and the roller 32, by which action the air inlet valve 18 is opened and the output pressure is attained. The position of the roller 32 is adjusted according to the higher one of the air spring pressures $AS_1$ and $AS_2$, in a manner similar to that explained relative to FIGS. 2 and 3.

The arrangement in accordance with the present invention, as applied to the foregoing load responsive control valve devices, as described above, is also applicable to other types of load response systems.

As described in the above, this present design provides a braking force corresponding to the higher of the air spring pressures, that is, the braking force of the safer side is obtained. Even in the case of an imbalance in the load of passengers and cargo, the braking force corresponding to the higher of the air spring pressures can be obtained, thus making load responsive braking safer. Also, in the case of the breakdown of one air spring, the brake functions normally, when the other air spring is normally operating. Similarly, the normal braking force can be obtained when one of the diaphragm plate pistons is damaged. For example, even if the air spring pressure $AS_1$ is lowered, due to a breakdown of diaphragm piston 15, there is not reduction in braking force, since the air spring pressure $AS_2$ on diaphragm plate piston 16 is normal. In the case of breakdown of diaphragm plate piston 16, only the air spring pressures $AS_1$ and $AS_2$ are combined without causing abnormalities, and no shortage in braking force results. The reliability of the load response system is increased, as well as the safety of vehicle operation, at a set reduced speed. It is particularly effective for attaining a safe braking force in simple vehicle operation in congested areas.

Having now described the invention, what we claim as new and desire to secure by Letters Patent, is:

1. For a vehicle having air springs to support the vehicle load, there is provided a load responsive valve device having input, output and exhaust ports, said load responsive valve device comprising:
  (a) valve means for establishing fluid pressure communication between said input and output ports in a first position and between said output and exhaust ports in a second position, and for terminating said fluid pressure communications in an intermediate position between said first and second positions;
  (b) a first piston abutment subject to fluid pressure of at least one of said air springs representative of the vehicle load;
  (c) means for transmitting the fluid pressure force exerted by said first piston abutment to said valve means to urge movement thereof toward said first position;
  (d) a second piston abutment subject to fluid pressure effective at said output port for urging said valve means toward said second position in opposition to said fluid pressure force exerted by said first piston abutment, said valve means assuming said intermediate position when the pressure at said output port corresponds to the vehicle load condition; and
  (e) said first piston abutment comprising at least two pistons having equal effective pressure areas arranged separately in tandem relationship, adjacent sides of said at least two pistons being subject to the fluid pressure of a first one of said air springs and the side opposite said adjacent side of one of said at least two pistons being subject to the fluid pressure of a second one of said air springs, so that the higher fluid pressure of said first and second air springs is effective to establish the fluid pressure at said output port in accordance with the vehicle load condition.

2. A load responsive valve device, as recited in claim 1, wherein said second piston abutment is connected to said valve means and said force transmitting means comprises a bias spring disposed under tension between said first and second abutments to urge said valve means toward said first position.

3. A load responsive valve device, as recited in claim 1 or 2, further characterized in that said one of said at least two pistons is engageable with the other of said at least two pistons to urge said valve means toward said first position when said second air spring fluid pressure is higher than said first air spring fluid pressure, and said one of said at least two pistons is disengaged from said other of said at least two pistons when said first air spring fluid pressure is higher than said second air spring fluid pressure.

4. A load responsive valve device as recited in claim 1, wherein said force transmitting means comprises:
  (a) a lever connected at one end to said valve means and at the opposite end to said first piston abutment;
  (b) a fulcrum with which said lever is engageable at a point intermediate the ends thereof;
  (c) a first bias spring disposed between said valve means and the casing of said valve device to urge said valve means toward said first position; and
  (d) a second bias spring disposed between said first piston abutment and the casing of said valve device to urge said first piston abutment in a direction opposite the direction of movement thereof responsive to the presence of said air spring fluid pressure thereat.

5. A load responsive valve device as recited in claim 4, wherein said fulcrum comprises a roller that is manually adjustable along the length of said lever.

6. For a vehicle having air springs to support the vehicle load, there is provided a load responsive valve device having input, output and exhaust ports, said load responsive valve device comprising:
  (a) valve means for establishing fluid pressure communication between said input and output ports in a first position and between said output and exhaust ports in a second position, and for terminating said fluid pressure communications in an intermediate position between said first and second positions;
  (b) a first piston abutment subject to a control fluid pressure;
  (c) force amplification means for connecting said first piston abutment to said valve means;
  (d) a second piston abutment subject to fluid pressure at said output port for urging said valve means toward said second piston in opposition to said fluid pressure force exerted by said first piston abutment via said force amplification means, said valve means assuming said intermediate position when the pressure at said output port corresponds to said control fluid pressure; and
  (e) a third piston abutment subject to fluid pressure of at least one of said air springs and connected to said force amplification means to adjust the pressure at said output port in accordance with the vehicle load condition, said third piston abutment comprising at least two pistons having equal effective pressure areas arranged separately in tandem relationship, adjacent sides of said at least two pistons being subject to the fluid pressure of a first one of said air springs and the side opposite said adjacent side of one of said at least two pistons being subject to the fluid pressure of a second one of said air springs, so that the higher fluid pressure of said first and second air springs is effective to establish the vehicle load adjusted fluid pressure at said output port.

7. A load responsive valve device as recited in claim 6, wherein said force amplification means comprises:
  (a) a first lever pivotally connected at one end to the casing of said valve device and projecting inwardly therefrom for engagement with said valve means;
  (b) a second lever pivotally connected at one end to the casing of said valve device and projecting inwardly therefrom in the opposite direction of said first lever for engagement with said first piston abutment, said first and second levers having spaced-apart relationship with each other; and
  (c) a roller member disposed in the space between said first and second levers and engageable therewith, so as to effect said connection of said first piston abutment with said valve means, said roller member being connected to said third piston abutment for movement along said levers in accordance with the pressure of the vehicle air springs, thereby varying the mechanical advantage of said first and second levers according to the vehicle load condition.

* * * * *